Aug. 13, 1968  J. W. KISLING III  3,396,448
METHODS FOR MANUFACTURE OF FLEXIBLE VALVE ELEMENTS
Filed Sept. 29, 1965  2 Sheets-Sheet 2

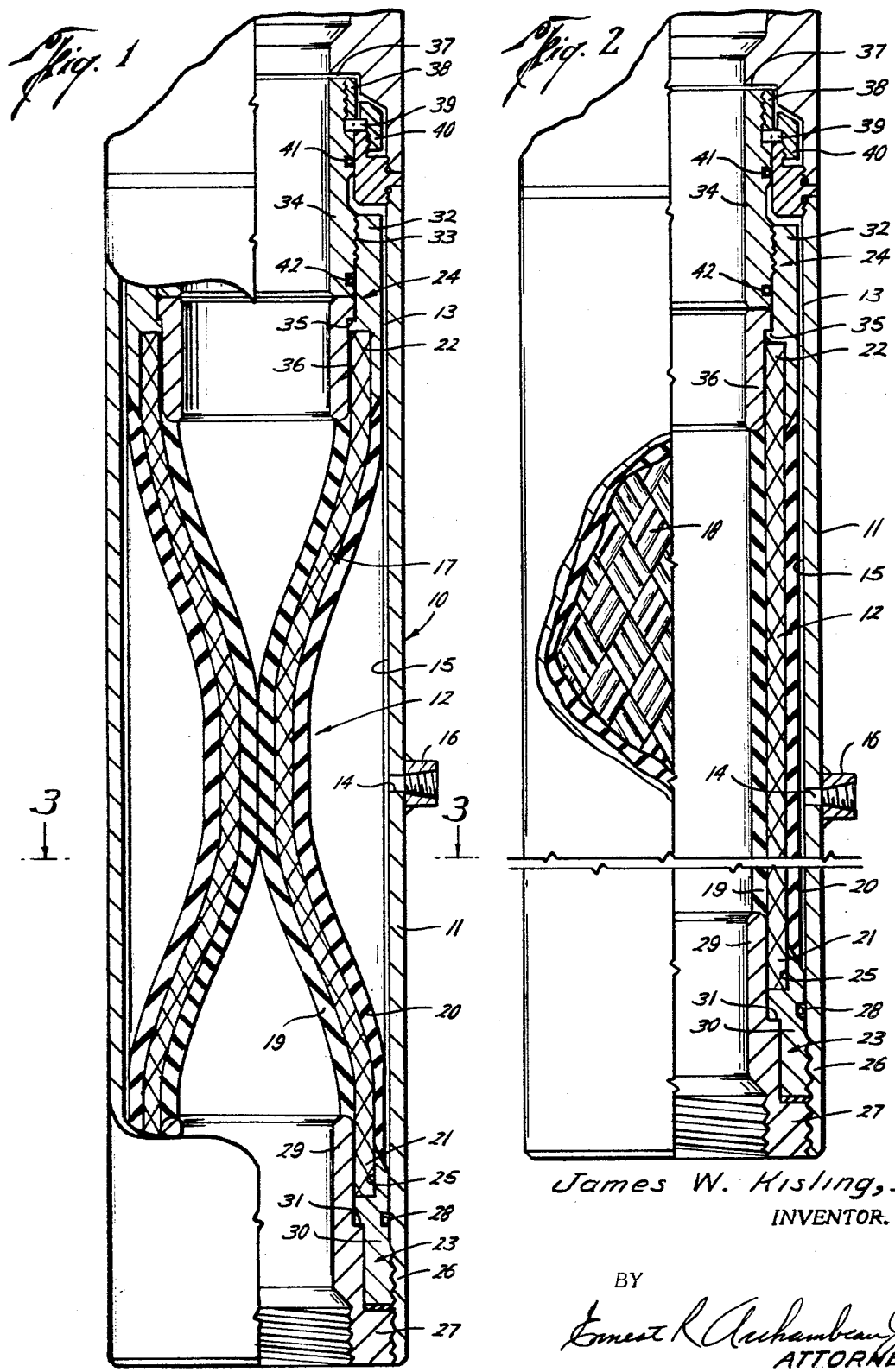

James W. Kisling, III
INVENTOR.

BY
Ernest R. Archambeau Jr.
ATTORNEY

United States Patent Office 3,396,448
Patented Aug. 13, 1968

3,396,448
METHODS FOR MANUFACTURE OF FLEXIBLE VALVE ELEMENTS
James W. Kisling III, Houston, Tex., assignor, by mesne assignments, to Schlumberger Technology Corporation, Houston, Tex., a corporation of Texas
Filed Sept. 29, 1965, Ser. No. 491,345
3 Claims. (Cl. 29—157.1)

ABSTRACT OF THE DISCLOSURE

This invention relates to methods for manufacturing new and improved constrictible flexible sleeve members for sleeve-type valves and the like. More particularly, the methods disclosed herein include assembling a plurality of reinforcing strands into a tubular mesh. The central portion of the mesh is then collapsed to draw individual strands relative to one another and into a relaxed position. After securing the ends of the strands, a fluid-impervious flexible sleeve is formed around the tubular mesh to complete the assembly.

---

Flexible conduit or collapsible sleeve valves have long been employed to control the flow of fluids having erosive and/or corrosive properties. Such valves are generally comprised of a resilient sleeve element concentrically disposed within a tubular housing, with the ends of the sleeve being fluidly sealed and firmly secured to the housing to provide a sealed annular space around the sleeve. By increasing the pressure within this outer annular space sufficiently in excess of that of the fluid flowing through the sleeve, the central portion of the sleeve is collapsed or constricted to control fluid communication through the sleeve.

It will be appreciated, however, that when a valve sleeve is constricted, the pressure differentials between the fluid downstream of the sleeve and those inside and around the sleeve will be acting on its full cross-sectional area. These pressure differentials can, therefore, exert substantial longitudinal forces on the sleeve, which forces must of course be carried, if at all, by the terminal portions of the sleeve that are secured to the housing. It will be further appreciated that the sleeve must also flex adjacent to these terminal portions each time it is actuated. Thus, repeated application of such longitudinal and flexure stresses on the terminal portions will ultimately cause a failure of the sleeve at or near these portions usually far in advance of any failure or deterioration in the collapsible central portion of the sleeve.

To overcome such failures, various measures have been proposed heretofore such as stiffening and greatly reinforcing the terminal portions of such sleeves. Although such measures have been generally satisfactory for relatively low-pressure applications, it has heretofore been considered impracticable to employ such valves in services where the pressure differentials could well be thousands of pounds per square inch.

Accordingly, it is an object of the present invention to provide new and improved methods for the manufacture of reinforced constrictible sleeve elements for service at even extreme pressure differentials.

This and other objects of the present invention are provided by forming a constrictible fluid-impervious flexible sleeve around a tubular mesh of reinforcing strands that has been first collapsed in its central portion to draw individual strands relative to one another and into a relaxed position before securing the ends of the strands relative to one another. As will subsequently be seen, these new and improved methods and arrangements provide reinforced constrictible sleeves that, even when closed against high pressure differentials, will be effectively sealed as well as impose a minimum of tensile stresses on their terminal ends.

The novel features of the present invention are set forth with particularity in the appended claims. The present invention, both as to its organization and manner of operation together with further objects and advantages thereof, may best be understood by way of illustration and example of certain embodiments when taken in conjunction with the accompanying drawings, in which:

FIG. 1 is an elevational view in partial cross-section of a valve formed by the methods of the present invention as it will appear when closed;

FIG. 2 is a view similar to FIG. 1, but showing the valve in its open position;

Figure 3:
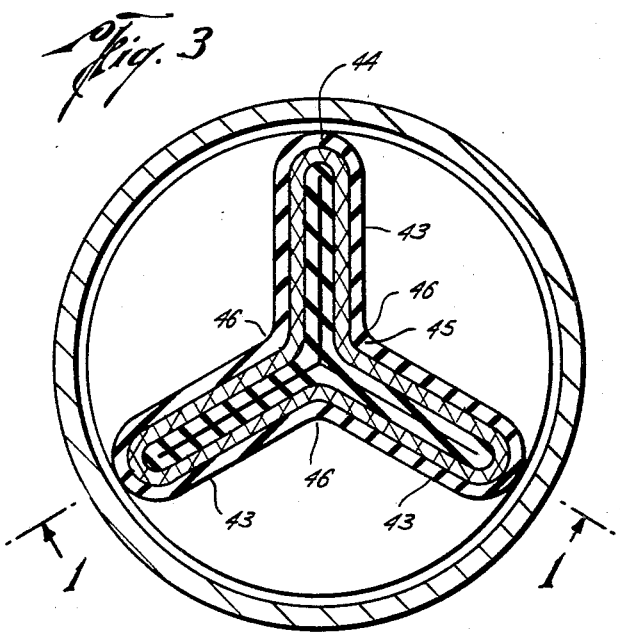
FIG. 3 is a cross-sectional view taken along the lines 3—3 of FIG. 1.

As seen in FIG. 1, a valve 10 is comprised of a tubular body 11 having a resilient sleeve member 12 formed by the methods of the present invention coaxially mounted within the body bore 13. Coupling means, such as threads or flanges (not shown), are provided on each end of the body 11 for coupling the valve 10 into a flow line (not shown). An aperture 14 through the central portion of the body 11 permits introduction of hydraulic or pneumatic operating fluids into the enclosed space 15 between the sleeve 12 and body. Suitable connecting means, such as a threaded pipe member 16, are provided to join the space 15 within the body 11 through the aperture 14 to an external source of pressurized operating fluid (not shown).

The flexible sleeve 12 of the present invention is comprised of a tubular mesh 17 formed of tightly woven flexible reinforcing strands, such as wire cables 18 (FIG. 2) or the like, that is substantially confined between inner and outer flexible tubes 19 and 20 of a fluid-impervious plastic or elastomeric material. To couple the sleeve 12 within the body 11, the ends 22 and 21 of the woven mesh 17 are extended beyond the flexible tubes 19 and 20 and connected to the body by suitable securing means such as tubular end fittings 23 and 24.

As seen in FIGS. 1 and 2, the exposed cable ends 21 at the lower end of the sleeve 12 are securely confined within a concentric annular socket 25 formed in the upper end of the lower end fitting 23. The lower end fitting 23 is, in turn, secured as by threads 26, to the upper end of an internal annular shoulder 27 in the lower end of the body 11 and fluidly sealed thereto by an O-ring 28.

To facilitate its manufacture and assembly, the lower end fitting 23 is preferably comprised of telescoped tubular members 29 and 30 that are interfitted together to define the cable end socket 25 and opposed, mating shoulders, as at 31, for holding the inner member 29 in position against body shoulder 27 when the outer member 30 is threadedly engaged therewith. A suitable potting compound, such as the epoxy composition described in U.S. Patent No. 3,003,798 or the like, is employed to secure the cable ends 21 within the socket 25 as well as to hold the inter-fitted end-fitting members 29 and 30 together.

The upper end fitting 24 is arranged substantially as the lower end fitting 23 but, however, is preferably not threaded to the body 11. Instead, to couple the upper end of the sleeve 12 to the body 11, the outer end-fitting member 32 is secured, as by threads 33, to an annular spacer member 34 which holds opposed shoulders, as at 35, of the end-fitting members 32 and 36 engaged. The upper end of the annular spacer member 34 is abutted against an internal body shoulder 37 and connected to a retainer ring 38. A key 39 on the annular spacer 34 is connected to the upper end of the body 11 by a second retaining ring 40 to prevent upward and downward movement as well as rotation of the end fitting 24 relative to the body. O-rings 41 and 42 around the annular spacer member 34 fluidly seal the upper end fitting 34 to the body 11.

Turning now to the particulars of the sleeve member 12 of the present invention, it will be realized that the usual practice is to constrict a resilient sleeve member by merely collapsing the opposite walls of its central portion together into a flattened, elongated oval cross-section. Inasmuch as each of these walls has a free length of one-half of the circumference of the sleeve ($\frac{1}{2}\pi D$), the collapsed central portion of the sleeve cannot be accommodated across the diameter of a closely fitting housing. Instead, unless the housing is enlarged, the collapsed central portion of a conventional sleeve must assume a generally sinuous lateral path and perhaps even double back on itself. It will be recognized, of course, that pressure differentials across such an irregularly constricted sleeve will impose unequal stresses in the end portions of the sleeve.

As best illustrated in FIG. 3, the valve sleeve member 12 of the present invention is fabricated in such a manner that, when collapsed, its central portion will assume a generally Y-shaped configuration of three equally spaced radial folds or bights 45. It will be recognized, of course, that when the sleeve 12 is fully opened, its circumference or perimeter will be equal to $\pi D$. On the other hand, when the central portion of the sleeve 12 is collapsed into the illustrated Y-shaped configuration, the perimeter around the three bights 43 will be substantially equal to six radii or three diameters. Thus, since the product of 3D is substantially equal to $\pi D$, it will be appreciated that the sleeve 12 is capable of closing uniformly about its central axis without creating any unequal circumferential stresses when a pressure differential is acting thereon. It should also be realized that the body 11 need not be enlarged to accommodate the collapsed sleeve member 12.

Returning momentarily to FIGS. 1 and 2, it will be recognized that the longitudinal spacing between end fittings 23 and 24 will always remain constant. Thus, upon collapse of the central portion of the sleeve 12 into the three radially disposed folds 43 as shown in FIG. 3, the length of a longitudinal path, such as at 44, through the sleeve wall at the outer end of any of the bights 43 will remain substantially constant. The length of a longitudinal path, such as at 45, through the sleeve wall midway between any two adjacent bights 43, however, will be substantially longer, as shown by FIG. 1. Thus, it will be appreciated that if the sleeve 12 of the present invention were formed in the usual manner, that is to say in a cylindrical tube, constriction of the sleeve would require substantial elongation of those strands along the bight.

Accordingly, as a primary facet of the present invention, the tubular mesh is formed in its collapsed position, as for example as shown in FIGS. 1 and 3, to eliminate elongation of the strands extending between the bights 43. Thus, the tubular mesh 17 may be formed of flexible members or strands 18 that are much stronger than heretofore usable in conventional sleeves since the strands 18 need not be stretched to close the sleeve 12. Moreover, in contrast to a conventional sleeve, even when the sleeve member 12 is closed against an extreme differential pressure, little or no tensile stresses will be imposed on the tubular mesh 17 that would otherwise be induced as a result of elongation of the mesh between the bights 43. It will be realized, of course, that tensile stresses will be imposed on the reinforcing members of any sleeve by a pressure differential across it. However, in the sleeve 12 of the present invention, it is not necessary to impose further stresses on the strands 18 by having to elongate some of them in order to constrict the sleeve. These stresses will instead be uniformly distributed through the strands 18 about the perimeter of the sleeve and transmitted uniformly through the tubular mesh to the end fittings 23 and 24.

To fabricate the sleeve 12 of the present invention, the tubular mesh 17 is woven from a plurality of flexible strands or members, such as wires, cords, or cables 18. To facilitate the weaving of the cables 18, it is preferred to first weave the tubular mesh 17 into a cylindrical sleeve of about twice the desired final diameter. Although other types of strands, weave arrangements and patterns may be employed, in one preferred embodiment of the invention, each of the cables 18 were comprised of steel wires stranded together to form a cable of approximately 0.120-inch diameter. The tubular mesh 17 was then woven in groups of three paralleled cables 18 which intersected adjacent groups at an angle of approximately 60°.

Then, upon completion of the enlarged tubular mesh 17, its ends are pulled in opposite directions until the tubular mesh has reached its desired final diameter. Pulling of the tubular mesh 17 will, of course, bring the individual cables 18 closer to one another as well as reduce their angle of intersection to about one-half of their initial angle.

The open ends of the tubular mesh 17 are then slipped over and loosely clamped to either a suitable mandrel (not shown) or the inner end fitting members 29 and 36 to transfix the open ends. By means of a suitable jig (not shown), force is applied radially inwardly at three equally spaced points around the circumferences of the tubular mesh 17 to displace its central portion into the above-mentioned Y-shaped cross-section. If desired, a Y-shaped jig (not shown) can also be temporarily inserted into the mesh 17 to facilitate the forming of the central portion.

As the mesh 17 is being constricted, it will be realized that certain ones of the cables 18 comprising the mesh will be drawn longitudinally relative to other cables and that certain other cables will be relatively undisturbed. When the tubular mesh 17 has been fully constricted, the longer ones of the cables 18 will define three circumferentially spaced indented surfaces 46 between shorter ones of the cables. Thus, it will be appreciated that although they are still relaxed, all of the cables 18 comprising the mesh 17 will be substantially in the position they will assume when pressure is applied around the completed fluid-impervious sleeve 12 to close it. Then, while the tubular mesh 17 is still held in its constricted position, the ends 21, 22 of the mesh are tightly clamped and, if desired, cut evenly. The end fittings 23 and 24 are then disposed around the cable ends 21, 22 and potted in place by the above-mentioned epoxy composition or other adhesives.

Once the end fittings 23 and 24 are in position, it will be appreciated that although the cables 18 are relaxed, the tubular mesh 19 will remain generally in a constricted position. The inner and outer flexible tubes 19 and 20 are then disposed within the tubular mesh 17 and sealed to the end fittings 23 and 24 to ensure a fluid-tight seal at each end of the tubes.

It should be understood, however, that the principles of the present invention are not limited to the above-described Y-shaped configuration. For example, the same procedure could be followed to form a sleeve that, when collapsed, its central portion will assume an X-shaped configuration of four equally spaced radial folds or bights. In view of the geometry of such a configuration, it will be appreciated that the outer ends of the radial folds or bights would not extend toward the housing as far as those illustrated in FIG. 3. In other words, the radial dimension through each of these bights would be only about three-fourths of the corresponding dimension shown in FIG. 3.

Similarly, a sleeve could be formed with its central portion flattened. This would require, of course, that the housing be of sufficient diameter to accommodate the flattened sleeve. In either event, by forming the reinforcing mesh with its cables fully relaxed and in the closed position, the objects of the present invention can be accomplished.

It will be realized that in many applications, corrosive and/or erosive liquids flowing through a flow line can require that a particular material be used for at least the inner sleeve 19. Although such special materials may be suited for the flowline fluid, it may well be that another material should or must be used for the outer sleeve 20. Thus, it is considered within the scope of the present invention to employ either the same or different materials for the two sleeves 19 and 20 where experience dictates that such materials be employed for the particular service. Moreover, specially arranged sleeves 19 and 20 can also be formed of plural laminations of various materials where flow-line conditions require such measures.

Figure 4:
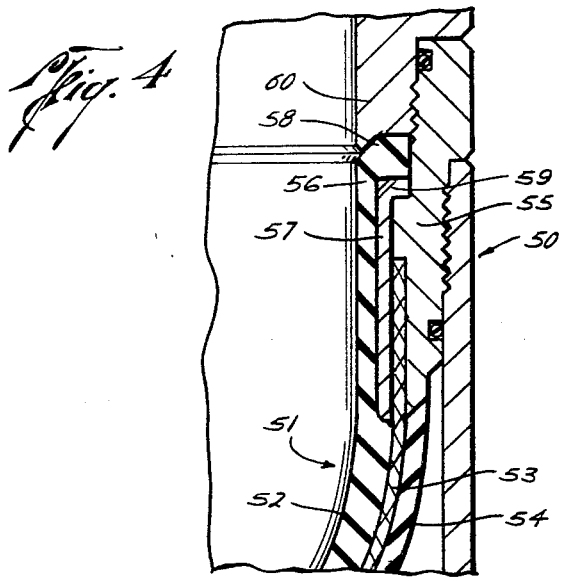
FIG. 4 is a view showing an alternate manner of securing a sleeve element formed in accordance with the principles of the present invention to an outer housing.

In many conditions of service, it is quite likely that the inner sleeve 19 could be expended more rapidly than the outer sleeve 20. Thus, as best seen in FIG. 4, a valve 50 is arranged to mechanically secure the ends of a sleeve 51 in such a fashion that the inner tube 52 can be replaced without disturbing the tubular mesh 53 or outer tube 54. To accomplish this, an end fitting 55 otherwise similar to those shown in FIGS. 1 and 2 is so arranged that the associated end 56 of the inner tube 52 extends through the inner fitting member 57. An outwardly directed enlargement or bead 58 on the tube end 56 is secured between the outer end 59 of the fitting member 57 and a cooperative retaining ring 60. It will be appreciated that the retaining ring 60 could either serve as a terminal for the valve 50 as shown in FIG. 4 or could be arranged generally as spacer member 34 in FIGS. 1 and 2. In any event, the inner tube 52 can be readily removed by removing the retaining ring 60 and its corresponding member (not shown) at the opposite end. Thus, replacement of the inner tube 52 is readily accomplished without requiring the disassembly of the valve 50 or removal of the tubular mesh 53 or outer tube 54.

Accordingly, it will be appreciated that by forming a constrictible fluid-impervious sleeve around a tubular mesh of reinforcing strands that has been initially collapsed in its closed position, reinforcing means will be provided that are capable of maintaining the sleeve tightly sealed even when closed against high pressure differentials. Moreover, by arranging the reinforcing strands in their relaxaed and constricted positions in accordance with the present invention, it will not be necessary for these strands to elongate upon closing of the sleeve. Thus, by being able to employ such stronger reinforcing strands than has heretofore been possible, a sleeve-type valve may be constructed that is capable of withstanding generally longitudinal loads imposed by even extremely high pressure differentials.

While particular embodiments of the present invention have been shown and described it is apparent that changes and modifications may be made without departing from this invention, and it is the aim in the appended claims to cover all such changes and modifications as fall within the true spirit and scope of this invention.

What is claimed is:
1. A method of fabricating a flexible valve element including the steps of: weaving a plurality of reinforcing strands together to form a meshed sleeve having a bore; transfixing the ends of said meshed sleeve to hold said sleeve ends open; displacing the central portion of said meshed sleeve inwardly to draw individual ones of said strands relative to one another and into a relaxed position where the central portions of said strands meet to substantially close said bore and, then, securing said sleeve ends relative to one another to maintain said strands in their relative positions; and enveloping said meshed sleeve with fluid-impervious flexible material.

2. A method for fabricating a valve including the steps of: weaving a plurality of reinforcing strands together to form a meshed sleeve having a bore; transfixing the ends of said meshed sleeve to hold said sleeve ends open; displacing the central portion of said meshed sleeve together from opposite sides to draw individual ones of said strands relative to one another into a relaxed position where the central portions of said strands converge to substantially close said bore, and, then, securing said sleeve ends relative to one another to maintain said strands in their relative positions; enveloping said meshed sleeve with fluid-impervious flexible material; and, thereafter, enclosing said enveloped sleeve within a tubular housing and fluidly sealing the ends of said enveloped sleeve and material relative to one another and said housing to define an enclosed space between said enveloped sleeve and housing.

3. A method for fabricating a flexible valve element including the steps of: weaving a plurality of reinforcing strands together to form a meshed sleeve having a bore; transfixing the ends of said meshed sleeve to hold said sleeve ends open; displacing the central portion of said meshed sleeve laterally together at circumferentially spaced points to draw individual ones of said strands relative to one another and into a relaxed position where the central portions of said strands converge along radial planes to substantially close said bore and, then, securing said sleeve ends relative to one another to maintain said strands in their relative positions; and enveloping said meshed sleeve with fluid-impervious flexible material.

References Cited
UNITED STATES PATENTS
| | | | |
|---|---|---|---|
| 2,995,335 | 8/1961 | Raftis | 251—5 |
| 3,203,662 | 8/1965 | Lau | 251—5 |

JOHN F. CAMPBELL, *Primary Examiner.*

R. B. LAZARUS, *Assistant Examiner.*